Jan. 13, 1925.　　　　　　　　　　　　　　　1,523,006
E. E. DUNNING
HOT AIR PIPE
Filed Oct. 31, 1921
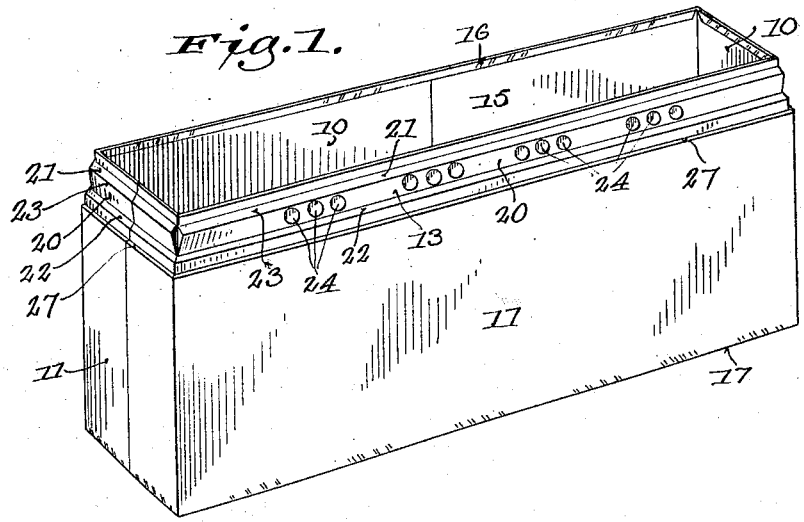
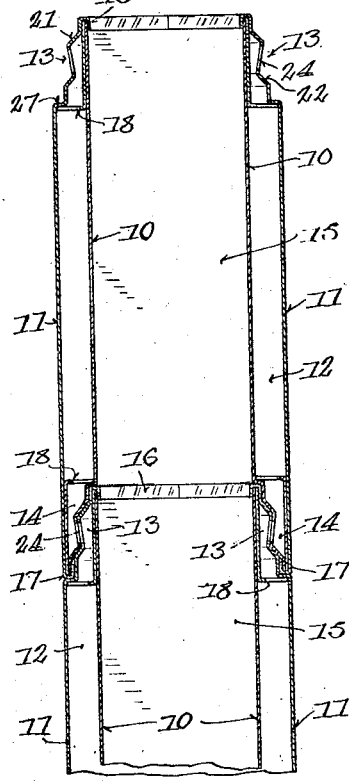
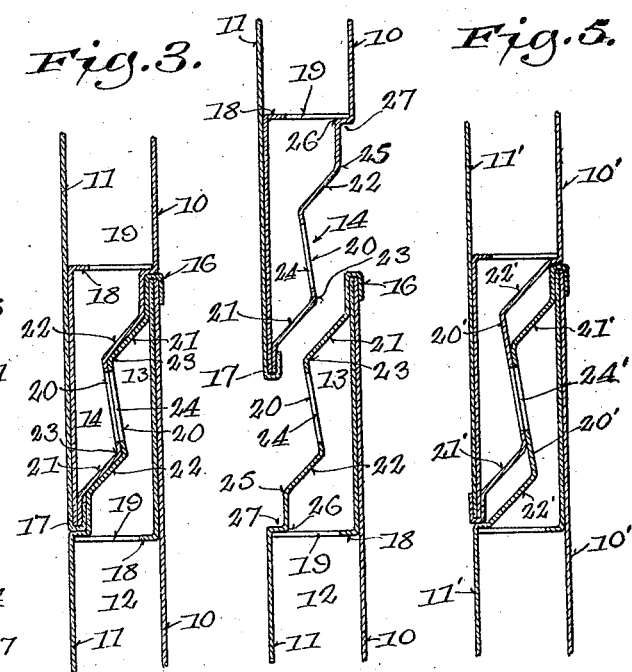
INVENTOR.
Emery E. Dunning.
BY Ralph W. Brown.
ATTORNEY.

Patented Jan. 13, 1925.

1,523,006

UNITED STATES PATENT OFFICE.

EMERY E. DUNNING, OF MILWAUKEE, WISCONSIN, ASSIGNOR TO THE DUNNING HEATING SUPPLY COMPANY, OF MILWAUKEE, WISCONSIN, A CORPORATION OF WISCONSIN.

HOT-AIR PIPE.

Application filed October 31, 1921. Serial No. 511,750.

*To all whom it may concern:*

Be it known that I, EMERY E. DUNNING, a citizen of the United States, residing at Milwaukee, in the county of Milwaukee and State of Wisconsin, have invented a certain new and useful Improvement in Hot-Air Pipes, of which the following is a full, clear, concise, and exact description, reference being had to the accompanying drawings, forming a part of this specification.

This invention relates to hot air pipes and, more particularly, to hot air pipes of the ventilated type.

Piping of this type is commonly employed in warm air heating systems and ordinarily includes an inner wall defining a warm air conduit, and an outer wall surrounding the inner wall and spaced therefrom to provide an insulating air space therebetween. This piping is ordinarily made up of double-walled, sectional units assembled in end to end relation in such manner as to permit a continuous flow of ventilating air through the insulating air space throughout the length of the piping.

The several units have heretofore been maintained in assembled relation by soldering or by the use of special fastening means provided for the purpose. This is a fact, in spite of the many attempts heretofore made to provide self locking units. This is due to the apparent inability to provide an automatic joint of sufficient tightness and firmness to insure and maintain the continuity of the ventilating space, as well as the warm air conduit, and to avoid leakage therebetween in any of the various positions the piping may have to assume when installed as a part of a heating system.

One object of the present invention is the provision of a self locking double-walled unit which may be easily fitted into assembled relation with like units to form a ventilated warm air piping having joints of sufficient rigidity and tightness without requiring the use of solder or other separate fastening means.

Another object is generally to improve and simplify the construction and assembly of piping of this type.

Other objects and advantages will later appear.

Two embodiments of this invention are illustrated in the accompanying drawings, in which:

Figure 1 is a perspective view of a pipe unit constructed in accordance with the present invention.

Figure 2 is a longitudinal sectional view of a portion of a hot air piping made up of a plurality of sectional units, such as that shown in Figure 1.

Figure 3 is an enlarged sectional view illustrating an assembled joint in detail.

Figure 4 is a similar view illustrating the relation of the parts before and during the assembling operation.

Figure 5 is a view similar to Figure 3 illustrating another form of point embodying features of the present invention.

The pipe unit illustrated in Figures 1 and 2 includes substantially parallel inner and outer walls 10 and 11, respectively, spaced apart to provide an insulating air space 12 surrounding the inner wall. These walls are connected by pairs of upper and lower bridge pieces 13 and 14, respectively, the bridge pieces of each pair being inclined in the same general direction so that several units may be assembled in internested end to end relation to form a continuous warm air conduit 15 within the inner walls 10.

In this instance, each upper bridge piece 13 constitutes an integral part of an outer wall and each lower bridge piece 14 an integral part of the inner wall 10. The upper edge of each bridge piece 13 is crimped over or otherwise secured to the upper edge of the inner wall 10, as indicated at 16, and the lower edge of the outer wall 11 is crimped over or otherwise secured to the lower edge of the bridge piece 14, as indicated at 17. The inner and outer walls are thus securely fixed against separation and no seams appear or project beyond the exposed faces of the piping. The inner and outer walls are maintained in proper spaced relation by the use of spacers, preferably in the form of metal strips 18, each bearing against one wall and having laterally disposed tabs or projections 19 bearing against the other wall. Each strip is secured in position by the engagement of one edge thereof within the adjacent crimped portion 16 or 17.

The bridge pieces 13 and 14 are corrugated in such manner as to securely maintain tight joints between contiguous units when assembled. In the form shown, particularly in Figures 3 and 4, each bridge piece includes an intermediate portion 20 presenting a face inclined reversely to the general inclination of the bridge piece. This portion is preferably yieldably suspended between the planes of the inner and outer walls by a pair of inclined portions 21 and 22. Portions 21 and 22 are preferably substantially parallel to one another but reversely inclined relative to the intermediate portion 20. The shoulder or rib 23 thus formed at the juncture of the intermediate portion 20 and portion 21 projects beyond or overhangs the intermediate portion 20.

In practice, this shoulder is preferably arranged to project beyond the median plane between the inner and outer walls so that when the units are assembled as indicated in Figures 2 and 3, the corresponding shoulders of the adjacent ends of contiguous units are in overlapping relation and thus serve to resist separation of the units. Each intermediate portion 20 is preferably flat so as to contact squarely with the corresponding portion of the contiguous unit and is provided with a series of perforations or openings 24 adapted to register with corresponding openings in the portion contacting therewith. Ventilating air is thus permitted to pass freely from the insulating air space 12 of one unit to the next throughout the length of the piping. Each portion 22 is preferably bent, as at 25 and 26, to form a seat 27 for snugly receiving the crimped portion 16 or 17 of the contiguous unit. By this construction, the two bridge pieces 13 and 14 of contiguous units are in firm contact substantially throughout their entire areas. A very tight joint is thus provided.

The units may be easily assembled by merely forcing the large end of one unit over the reduced end of the other. The pressure necessary for this assembling operation is very slight since the portions 21 will yield easily to the assembling pressure and thus permit the shoulders 23 to pass one another. After assembly, however, separation of the units can be accomplished only by the exertion of considerable external force. This is due to the overlapping relation of the shoulders 23 and the angular relation of the portions 21. Any force tending to separate the units is resisted by the increased pressure thus created between the contacting faces of the intermediate portions 20 due to their reverse inclination. This pressure is further increased by the lateral pressure created by the portions 21 as they tend to swing toward the corresponding intermediate portions 20 under the separating force. The units are thus effectively locked against accidental separation.

The joint illustrated in Figure 5 is similar in many respects to that just described in that it includes a pair of bridge pieces each having inclined intermediate portions 20' yieldably suspended between the planes of the inner and outer walls 10' and 11' of the pipe units. These portions are arranged to contact as shown and are provided with registering openings 24' through which the ventilating air may pass. In this instance, however, the relation of the parts is such that the portion 21', though substantially parallel with the portion 22', is spaced somewhat therefrom when the units are assembled.

Various changes may be made in either of the embodiments of the invention hereinabove described, without departing from or sacrificing any of the advantages of the invention as defined in the following claims:

I claim:

1. In a ventilated warm air piping the combination of a plurality of internested pipe units, each unit having an inner wall defining a warm air conduit, an outer wall spaced therefrom to form an insulating air space, and similarly formed bridge pieces between said walls at each end of said unit, each bridge piece having an inclined face yieldably suspended between said walls and bearing against the corresponding face of the adjacent unit to prevent accidental separation of said units.

2. In a ventilated warm air piping the combination of a plurality of internested pipe units, each unit having an inner wall defining a warm air conduit, an outer wall spaced therefrom to form an insulating air space, and similarly formed bridge pieces between said walls at each end of each unit, each bridge piece having an intermediate portion yieldably suspended between said walls reacting against the corresponding portion of the adjacent bridge piece to resist separation of the units.

3. A sectional pipe unit having spaced inner and outer walls and an inclined bridge piece connecting said walls at one end of the unit, said bridge piece having a portion yieldably suspended between the planes of said walls and presenting a face inclined reversely to the general inclination of said bridge piece for engagement with a similar face of another unit when assembled therewith, and an opening through said portion to permit air to pass from one unit to another.

4. A sectional pipe unit having spaced inner and outer walls and connections between said walls at one end of the unit, said connections including a sheet metal member bent to provide a shoulder yieldably supported between and spaced from the planes of said walls and adapted to project into overlapping relation with the correspondingly formed shoulder of another unit when assembled therewith to resist separation of the units.

5. A sectional pipe unit having spaced inner and outer walls and connections between said walls at one end of the unit, said connections including a sheet metal member bent to provide a shoulder yieldably supported between and spaced from the planes of said walls and adapted to project into overlapping relation with the correspondingly formed shoulder of another unit when assembled therewith to resist separation of the units, and openings through said connections to permit a flow of air from one unit to another.

6. A pipe unit of the character described having spaced inner and outer walls and connections between said walls at the opposite ends thereof, each connection having a pair of similarly inclined portions each connected with one of said walls, and an intermediate portion supported by said inclined portions and reversably inclined relative thereto, said intermediate portion being arranged to bear upon the corresponding portion of an adjacent unit when assembled therewith.

7. A pipe unit of the character described having spaced inner and outer walls and connections between said walls at the opposite ends thereof, each connection having a pair of similarly inclined portions arranged one above another and each connected with one of said walls, an intermediate portion yieldably supported by said inclined portions and reversely inclined relative thereto, and openings through said intermediate portion.

8. A pipe unit of the character described having inner and outer walls, a bridge piece connecting said walls at one end of the unit, a crimped connection between one of said walls and said bridge piece, and a spacer element extending between said walls and having a portion engaged within said crimped connection to secure said element in position.

In witness whereof, I hereunto subscribe my name this 28th day of October, 1921.

EMERY E. DUNNING.